Patented Nov. 28, 1933

1,936,636

UNITED STATES PATENT OFFICE 1,936,636

COMPOSITION OF MATTER FOR USE IN PRODUCING LEAVENED BAKERY PRODUCTS

Charles Harold MacIntosh, Kansas City, Mo., assignor to C. J. Patterson Corporation, Kansas City, Mo., a corporation of Missouri No Drawing. Application November 7, 1931
Serial No. 573,721

12 Claims. (Cl. 99—10)

This invention relates to a new and useful composition of matter adapted for use in processing flour such as wheat flour, in making dough for yeast leavened bread and other similar bakery products and constitutes one of that type of compositions referred to in this art as flour improvers.

This invention also relates to the processes involved in mixing, fermenting and making baked leavened products employing the novel composition of matter above referred to.

It is an object of this invention to provide a new and improved composition of matter which may be mixed with flour and other ingredients constituting a dough mix for leavened bakery products which will exert a marked effect upon the fermentation and dough developing processes, productive of highly improved baked products having finer texture and grain, better crumb color, better flavor and better keeping qualities than have been attainable prior to this invention.

It is a further object of this invention to provide a novel composition of matter for use in dough mixes as above described, which is not only productive of better products but will also increase the yield, both in volume and weight, from a given weight of ingredients.

A further and important object is that of providing a novel composition of matter, which is productive of all of the above stated objects and in addition, serves as a buffer during the fermentation process whereby greater tolerance results at the stage of maturity enabling the production of substantially similar dough batches by fermentation treatments of sponge doughs varying as widely as three or four hours and with straight dough as widely as thirty minutes to one hour.

It is a further object of this invention to provide ingredients in this novel composition of matter which act conjointly with the buffering action above referred to, to effect a more widely and uniformly distributed generation of gases, producing larger volume and an increased number of smaller gas cells in the final product.

A further and important object is that of providing a novel composition of matter for use in dough mixes which is effective to give to the dough, a very much greater gas retention quality, that is to say; a tougher and yet a more homogeneous and flexible consistency, so that the large number of individual gas cells remain intact without rupturing, resulting in a very desirable smooth texture and the retention, insofar as applicant is aware, in the final dough ready for baking of approximately twenty percent more gas than has heretofore been obtainable. The increased gas retention produces loaves of bread or other products of more uniform texture and better keeping quality.

A further object of this invention is to provide a process for mixing, fermenting and baking leavened products employing the novel composition of matter above referred to.

The composition of matter of this invention is adapted to be made up and sold to the baking industry as a substance to be added to flour during the dough mixing operation or if desired, it is contemplated that the ingredients constituting the composition may be added to the flour as it is sold in bulk to the baking trade so as to be initially in improved condition.

In order to assist in an understanding of this invention a brief review will now be given of the discoveries which have been made as to the chemical and physical conditions prevailing during dough producing processes.

In the first place, it is now known that a dough mixture is a colloidal suspension consisting of the well known and characteristic plastic mass produced by mixing water and flour.

When yeast with its enzymes are introduced into a mass of dough, it is found that fermentation takes place resulting in the generation of large quantities of carbon dioxide gas. One function of the yeast and the fermentation action produced thereby is that of gas generation which results in the final light, cellular or spongy construction of the final products. However, the fermentation process has another important function which is that of producing products of fermentation which progressively increase the acid content in the dough mix and the hydrogen ion concentration thereof. In view of the fact that dough mixes are known to be colloidal suspensions, and further that the condition of colloids is markedly effected by hydrogen ion concentration, it is known that the maturing of dough under the effect of the fermentation process progresses with the development and final attainment of the particular hydrogen ion concentration productive of the desired physical characteristics in the dough for good bread or other bakery products. By physical consistency is meant the elasticity, toughness, viscosity and other properties which influence the gas retention, expansibility and strength of the sponge structure.

It is also known, in accordance with present methods, that the amount of carbon dioxide generated during the normal fermentation period is many times in excess of that which is required in producing the final cellular structure of the bread; or in other words, it is many times that which is finally retained in the final baked product.

From this fact, it will appear that the final spongy condition of any particular bread, will depend upon its gas retention properties and the film producing properties of the mix, and not primarily upon the vigor of the gas generating action. Obviously, if a dough is extremely elastic, and yet tough, and is capable of producing extremely thin films which will not rupture, final products may be produced therefrom which are of increased volume for a given weight of dough and have a larger number of smaller gas cells of substantially uniform size.

It is this condition which is desired in bread and similar products on account of the increased volume, improved appearance and better keeping qualities. It is found that the finer and more uniform the cellular structure, the slower the drying out action of bread, resulting in fresh salable products for longer periods of time.

In bread making processes as now practiced, it is known that great care must be exercised in setting the dough in ovens for baking at an exact point in the fermentation process, referred to as maturity, as it is found that at the point where the hydrogen ion concentration is exactly right for producing the best physical properties in the mature dough, the acid generation is relatively rapid and that the hydrogen ion concentration is damagingly increased in a relatively short period. A more acid condition destroys the desired physical properties and results in a dough, referred to in the trade as "old" dough, which is unsatisfactory for good commercial products.

At present, the period during which the dough is in the mature stage extends only for a few minutes so that it is essential in present bread making processes to carefully watch the progress of the fermentation action and to make sure that the whole operation of the bakery plant is properly synchronized to enable the baking of each dough batch at the particular moment when the dough is in the desired colloidal condition.

This burden, which is now on the bakers, is one of the most important drawbacks in the entire process, as it requires that all operations from the commencement of the dough mixing step to the completion of the baking step, be conducted on a definite schedule involving synchronous operation of the entire baking plant. A schedule of this kind is not only difficult to maintain and expensive to practice, but in the event of any mishap, in any department, large wastes result which diminish the output and materially increase costs.

The limited period now available in known processes at which the dough is mature and should be baked is so short that ofttimes difficulty is encountered in making uniform products from the dough of a single batch because it is found that there is a marked difference in the maturity of the loaves which are taken from the batch initially and those last taken from the batch. The first loaves are imperfect because they are taken at a period when the dough is immature or "young" whereas, the last loaves are over-matured or "old".

In view of this difficulty, the novel composition of matter provided by the present invention has two important effects insofar as maturity is concerned, which are, first: the production of an initially higher hydrogen ion concentration so as to more nearly approach at the outset, the colloidal condition sought at the point of maturity, and secondly, a buffering effect, after the fermentation process has produced the desirable hydrogen ion concentration, preventing the concentration from rapidly increasing in the usual manner productive of "old" or over-matured doughs.

This point will be illustrated by the table hereinafter given which shows the comparative hydrogen ion concentrations taken after each hour of maturity, as produced in fermentation operations of mixes containing substances now known and used and herein referred to as "yeast foods" and, the new composition of matter of this invention.

The table is as follows:

| Fermentation period | pH with known yeast foods | pH with composition of the present invention |
|---|---|---|
| Initial | 5.799 | 5.630 |
| 1 hour | 5.765 | 5.613 |
| 2 hours | 5.647 | 5.528 |
| 3 hours | 5.241 | 5.139 |
| 4 hours | 4.970 | 5.156 |
| 5 hours | 4.784 | 5.004 |
| 6 hours | 4.734 | 4.953 |
| 19½ hours | 4.615 | 4.818 |

An inspection of the table will show that in the case of an average sponge fermentation of six hours with ordinary yeast foods, the total change in pH is 1.065 while that of the composition of the present invention is 0.677. Even with an excessive fermentation of 19½ hours indicated in the last line of the table, the hydrogen ion concentration of sponges employing the substance of the present invention is appreciably less than that of sponges employing ordinary yeast foods.

The composition of matter of this invention employs the following substances as essential ingredients: Calcium acid phosphate and a mixture of a bromate and an iodate, preferably supplied as salts of potassium. In addition, it is found desirable to also include ammonium sulphate. Sodium chloride and flour, starch or edible farinaceous products may also be added in the particular proportion specified in the following table. A typical formula which is given by way of example, may be as follows:

|  | Percent |
|---|---|
| Calcium acid phosphate | .2 |
| Ammonium sulphate | .028 |
| Potassium bromate | .0005 |
| Potassium iodate | .0004 |
| Sodium chloride | .08 |
| Flour | .0911 |
| Total | .4000 |

On the basis of percentage, the mixture of the above named substances totals four tenths of one per cent and it is contemplated that this quantity of the mixture be used with 99.6 per cent of flour in making up an ordinary batch of dough for bread making purposes.

The particular function and importance of each of the named ingredients will now be given, it being first understood, as above mentioned, that the calcium acid phosphate and the mixture of bromate and iodate are the important ingredients. The calcium acid phosphate is the buffer material referred to which acts to hold the hydrogen ion concentration at approximately the point of maturity for prolonged periods of three to four hours in sponge dough, thirty minutes to an hour for straight dough, as distinguished from a period of a relatively few minutes in processes now known and used.

The calcium acid phosphate further acts to give to the dough mix, an initially higher hydrogen ion concentration so that at the outset, the dough is brought to a colloidal condition which is closer to the desirable condition known as maturity. The mixture of bromate and iodate is effective to increase the enzyme activity in a manner that is now well understood to be characteristic of either of these substances alone, and in addition, when combined, to produce a more uniformly distributed generation of gases and therefore an increased number of smaller gas cells.

The action of the mixture of bromate and iodate together with the effect of the calcium acid phosphate is that of producing more quickly, the desired hydrogen ion concentration and the necessary colloidal condition existing at maturity.

It is known that bromates and iodates have been proposed for use as flour improvers, prior to this invention, but it is important to note, that the combined action of these substances is far in excess of the summation of the effects of either used separately. In other words, the use of bromates and iodates jointly, produces a result far in excess of what would be expected from a knowledge of the action of either of these substances used alone, irrespective of the quantities employed.

In addition, the combined action of the bromates and iodates is further increased when used jointly with calcium acid phosphate whereby a new and different composition is produced giving results far in excess of that which would be expected from a knowledge of the action of any of the substances used separately.

In other words, the combination of the three substances, calcium acid phosphate, a bromate and an iodate produces an entirely new and different product, the use of which gives results far superior to those heretofore attainable.

It is found that with the three substances together, a gas retention quality is realized which cannot be produced by employing any other known substances or combination of substances.

The advantages are better shown by the following tables, the first of which is a comparison of the gas generating activity first, when yeast foods now on the market are used, such as that disclosed in the United States Patent No. 1,151,526, and secondly, when the composition of this invention is used.

| Fermentation time in minutes | Gas generated in cubic centimeters with known yeast foods | Gas generated in cubic centimeters with composition of the present invention |
|---|---|---|
| 30 | 12 | 6 |
| 60 | 27.5 | 25 |
| 90 | 42.5 | 38 |
| 120 | 61 | 57 |
| 150 | 82.5 | 78 |
| 180 | 106 | 103 |
| 210 | 131 | 126 |
| 240 | 155.5 | 150 |
| 270 | 178 | 171 |
| 300 | 200 | 193 |

The above table shows that in practicing this invention, the gas generated is slightly less than with other substances although the difference is so slight as to be of little or no importance. This will be better appreciated after comparison with the following table, which gives the gas retention properties of each.

The following table shows that only a relatively small percentage of the gas generated is retained and therefore, if any consideration should be given to the gas generating activity, it should be noted that the generation of less gas is more desirable. All gas that is generated but not retained, escapes into the atmosphere and is a total loss and serves to diminish the weight of the remaining ingredients. The gas retention table is as follows:

| Fermentation time in minutes | Gas retained in cubic centimeters with known yeast foods | Gas retained in cubic centimeters with composition of the present invention |
|---|---|---|
| 30 | 12 | 11 |
| 60 | 23 | 21.5 |
| 90 | 34 | 32.5 |
| 120 | 36 | 46 |
| 150 | 56 | 62.5 |
| 180 | 59.5 | 70 |
| 210 | 58.5 | 70 |
| 240 | 60 | 72.5 |
| 270 | 54 | 73.5 |
| 300 | 56 | 70 |

From the above it will be noted that after the passing of approximately one hundred and twenty minutes, that the gas retention qualities given to the dough by the composition of the present invention, greatly increases over that of other substances known on the market, with the result that after about four hours approximately twenty per cent more gas is held in the dough.

The loaves will show a very fine cellular structure due to the gas retention produced by the colloidal condition resulting from the use of the three mentioned salts of the invention and the widely subdivided and homogeneous distribution of the gas generating activity.

The ammonium sulphate mentioned in the above table is not at all necessary, but, it has been found that when it is omitted, a very much larger amount of calcium acid phosphate must be used to get the same results.

It is desirable to use both as above specified as exactly the same results can be produced with only two tenths of one per cent of calcium acid phosphate when approximately .028 of ammonium sulphate is also included.

The action of the ammonium sulphate in this particular is not clearly understood, but its effect on the final results is known.

In addition the ammonium sulphate no doubt serves as a source of nitrogen as food for the yeast cells in accordance with well known principles, whereby the yeast cells may be properly nourished without excessively attacking the proteins of the flour. It is well known and has been previously demonstrated that yeast cells possess the ability to extract nitrogen from ammonia for food and to propagate in the presence of salts containing ammonia.

The flour content of the above mixture is added merely for the purpose of giving bulk to the mix whereby it may be more readily handled and measured without involving the use of such small quantities as would be apt to result in wide inaccuracies in proportion. When the mix is made in accordance with proper proportions in large bulk, the desired quantities may thereafter be determined and added to dough mixes with considerabe accuracy. The salt specified may or may not be employed but it is preferably added as a substance which is cheap, adds bulk and serves well in the mix.

The above formula is given merely by way of example as one preferred method of practicing this invention and should not be construed as a limitation.

In practice, dough can be made up either in accordance with the well known sponge process where a preliminary fermentation period of substantial length is first performed, or in accordance with the process known in the trade as "straight dough" process, wherein the preliminary sponge forming operation is omitted. These processes are too well known to be described in detail herein but it should be noted that the advantages claimed for this invention are applicable to either method.

The important considerations of this invention are: The provision of a substance including calcium acid phosphate and a mixture of a bromate and an iodate used in substantially the proportions specified.

Further, that the quantity of calcium acid phosphate may be materially reduced with the same good results when a quantity of ammonium sulphate is also employed. That the function of the calcium acid phospate is that of producing an initial hydrogen ion concentration which is closer to the point of maturity at the outset and further, that of serving as a buffer to prevent the dough from over-aging and providing a tolerance at maturity for prolonged periods of four hours with sponge dough, and thirty minutes to one hour with straight dough when necessity demands.

Further, that the mixture of a bromate and an iodate used jointly with the calcium acid phosphate, produces a colloidal condition resulting in a much higher gas retention and the formation of an increased number of smaller gas cells. This last characteristic produces a larger loaf of bread for a given weight of dough and a more uniform smoothly appearing cell and grain structure, having greatly increased keeping qualities.

This composition of matter may be supplied and sold separately, preferably mixed with the quantities of flour and salt, above specified, so that approximately four tenths of one per cent is used with 99.6 per cent of flour in mixing commercial dough batches or if it is desired, approximately the same quantity in proportion of the present ingredients may be added to flour initially and sold to the trade in this form.

It has been demonstrated by actual experiment, that a tolerance of three to four hours is provided by the inclusion of the calcium acid phosphate in sponge dough which is productive of a most revolutionary improvement in the baking industry. Such latitude has never been provided in any commercial baking process and heretofore on account of the limited tolerance permitted, which was only a matter of a few minutes, tremendous expense and loss has been suffered in the daily manufacture of bread. In addition to the loss, the bread of any particular bakery has lacked uniformity as only a relatively few loaves out of each batch could be taken and baked at the point of exact maturity.

With the present substance, good uniformity is realized which is attributable to the increase in tolerance in the maturing period whereby substantially the degree of maturity of all doughs results even though there may be relatively wide variance between the lengths of their maturing periods.

By the term "bread" as used in this specification and in the appended claims is meant yeast leavened bread including all forms thereof such as pan bread, hearth bread, rolls and all analogous forms, but not including cake or crackers. By the term "calcium acid phosphate" is meant that substance having the following formula: $CaH_4(PO_4)_2$.

I claim:

1. A composition of matter of the character described adapted for use with yeast and approximately 100 parts of flour in making leavened bread comprising the following substances in substantially the proportions specified:

| | Parts by weight |
|---|---|
| Calcium acid phosphate | .2 |
| Ammonium sulphate | .028 |
| Potassium bromate | .0005 |
| Potassium iodate | .0004 |

2. A composition of matter of the character described adapted for use with yeast and approximately 100 parts of flour in making leavened bread comprising the following substances in substantially the proportions specified:

| | Parts by weight |
|---|---|
| Calcium acid phosphate | .2 |
| Ammonium sulphate | .028 |
| Potassium bromate | .0005 |
| Potassium iodate | .0004 |
| Sodium chloride | .08 |
| Flour | .0911 |

3. The process of making leavened bread which comprises incorporating with yeast, flour and other ingredients, a mixture of the following substances in substantially the proportions specified based on 100 parts of flour:

| | Parts by weight |
|---|---|
| Calcium acid phosphate | .2 |
| Ammonium sulphate | .028 |
| Potassium bromate | .0005 |
| Potassium iodate | .0004 |

4. The process of making leavened bread which comprises incorporating with yeast, flour and other ingredients a mixture of the following substances in substantially the proportions specified based on 100 parts of flour:

| | Parts by weight |
|---|---|
| Calcium acid phosphate | .2 |
| Ammonium sulphate | .028 |
| Potassium bromate | .0005 |
| Potassium iodate | .0004 |
| Sodium chloride | .08 |
| Flour | .0911 |

5. A composition of matter of the character described adapted for use with yeast in making leavened bread comprising a bromate, an iodate, and calcium acid phosphate in quantity sufficient to buffer the dough mass during fermentation and thereby substantially to prolong the period during which the hydrogen ion concentration of the dough mass is within the range characterising the optimum maturity thereof.

6. A composition of matter of the character described adapted for use with yeast in making leavened bread comprising potassium bromate, potassium iodate, and calcium acid phosphate in quantity sufficient to buffer the dough mass during fermentation and thereby substantially to prolong the period during which the hydrogen ion concentration of the dough mass is within the range characterising the optimum maturity thereof.

7. A composition of matter of the character described adapted for use with yeast in making leavened bread comprising a bromate, an iodate, ammonium sulphate, and calcium acid phosphate in quantity sufficient to buffer the dough mass during fermentation and thereby substantially to prolong the period during which the hydrogen ion concentration of the dough mass is within the range characterising the optimum maturity thereof.

8. A composition of matter of the character described adapted for use with yeast in making leavened bread comprising potassium bromate, potassium iodate, ammonium sulphate and calcium acid phosphate in quantity sufficient to buffer the dough mass during fermentation and thereby substantially to prolong the period during which the hydrogen ion concentration of the dough mass is within the range characterising the optimum maturity thereof.

9. The process of making leavened bread which comprises incorporating with a quantity of a bromate and an iodate with yeast, flour and other ingredients of the dough batch, a quantity of calcium acid phosphate sufficient to buffer the dough, and thereby substantially to prolong the period during which the hydrogen ion concentration of the dough batch is within the range characterising the optimum maturity thereof, and fermenting the batch.

10. The process of making leavened bread which comprises incorporating with a quantity of potassium bromate and potassium iodate with yeast, flour and other ingredients of the dough batch, a quantity of calcium acid phosphate sufficient to buffer the dough, and thereby substantially to prolong the period during which the hydrogen ion concentration of the dough batch is within the range characterising the optimum maturity thereof, and fermenting the batch.

11. The process of making leavened bread which comprises incorporating with a quantity of a bromate, an iodate, and ammonium sulphate with yeast, flour and other ingredients of the dough batch, a quantity of calcium acid phosphate sufficient to buffer the dough, and thereby substantially to prolong the period during which the hydrogen ion concentration of the dough batch is within the range characterising the optimum maturity thereof, and fermenting the batch.

12. The process of making leavened bread which comprises incorporating with a quantity of potassium bromate, potassium iodate, and ammonium sulphate with yeast, flour and other ingredients of the dough batch, a quantity of calcium acid phosphate sufficient to buffer the dough, and thereby substantially to prolong the period during which the hydrogen ion concentration of the dough batch is within the range characterising the optimum maturity thereof, and fermenting the batch.

CHARLES HAROLD MacINTOSH.